United States Patent
Yamazaki et al.

(10) Patent No.: US 10,040,716 B2
(45) Date of Patent: Aug. 7, 2018

(54) GLASS SHEET

(71) Applicant: ASAHI GLASS COMPANY, LIMITED, Chiyoda-ku (JP)

(72) Inventors: Shuji Yamazaki, Tokyo (JP); Shusaku Akiba, Tokyo (JP); Seiki Ohara, Tokyo (JP); Kazunari Tohyama, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 4 days.

(21) Appl. No.: 15/631,554

(22) Filed: Jun. 23, 2017

(65) Prior Publication Data

US 2017/0283304 A1 Oct. 5, 2017

Related U.S. Application Data

(63) Continuation of application No. PCT/JP2015/085723, filed on Dec. 21, 2015.

(30) Foreign Application Priority Data

Dec. 25, 2014 (JP) ................................. 2014-261984

(51) Int. Cl.
*C03C 3/085* (2006.01)
*C03C 3/097* (2006.01)
*C03C 21/00* (2006.01)
*C03C 4/18* (2006.01)

(52) U.S. Cl.
CPC .............. *C03C 3/097* (2013.01); *C03C 3/085* (2013.01); *C03C 4/18* (2013.01); *C03C 21/002* (2013.01); *C03C 2204/00* (2013.01)

(58) Field of Classification Search
CPC ......... C03C 3/085; C03C 3/087; C03C 3/097; C03C 21/00; C03C 21/002
See application file for complete search history.

(56) References Cited

U.S. PATENT DOCUMENTS

| | | | |
|---|---|---|---|
| 5,021,366 | A | 6/1991 | Aitken |
| 5,952,253 | A | 9/1999 | Dejneka et al. |
| 2012/0135226 | A1 | 5/2012 | Bookbinder et al. |
| 2013/0122284 | A1 | 5/2013 | Gross |
| 2014/0087194 | A1 | 3/2014 | Dejneka et al. |
| 2016/0257603 | A1 | 9/2016 | Bookbinder et al. |

FOREIGN PATENT DOCUMENTS

| | | | |
|---|---|---|---|
| JP | 3164223 | | 5/2001 |
| JP | 2002-512584 | | 4/2002 |
| JP | 2012-20894 | | 2/2012 |
| JP | 2012020894 | A * | 2/2012 |
| JP | 2013-544227 | | 12/2013 |
| WO | WO 2013/074779 | A1 | 5/2013 |

OTHER PUBLICATIONS

International Search Report dated Mar. 22, 2016 in PCT/JP2015/085723 filed Dec. 21, 2015 (with English translation).
Written Opinion dated Mar. 22, 2016 in PCT/JP2015/085723 filed Dec. 21, 2015.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

A glass sheet includes, as represented by mole percentage based on oxides, from 55.5 to 80% of $SiO_2$, from 12 to 20% of $Al_2O_3$, from 8 to 25% of $Na_2O$, 2.5% or more of $P_2O_5$, and 1% or more of an alkaline earth metal RO (RO is $MgO+CaO+SrO+BaO$).

7 Claims, No Drawings

GLASS SHEET

TECHNICAL FIELD

An embodiment of the present invention relates to a glass sheet. In particular, the embodiment relates to a glass sheet for chemical strengthening, that is, a glass sheet which can be suitably used in a chemically strengthened glass.

BACKGROUND ART

In recent years, information equipment including a touch panel display, as in a tablet PC, a smart phone, an electronic book reader, or the like has been the mainstream.

Any glass of a touch sensor glass, a cover glass, and a glass of OGS (one glass solution) is required to have a thin thickness and high strength, and a chemically strengthened glass which is subjected to a chemical strengthening treatment through ion exchange is used.

Strengthening characteristics of the chemically strengthened glass are generally expressed by a surface compressive stress (CS) and a depth of compressive stress (DOL: depth of layer).

A surface compressive stress layer formed by the chemical strengthening prevents a fracture occurring by an impact from being propagated. It is disclosed that phosphoric acid is contained in the composition thereof, and thus further damage resistance is obtained without degrading chemical strengthening characteristics (for example, see Patent Literature 1).

CITATION LIST

Patent Literature

Patent Literature 1: JP-T-2013-544227 (the term "JP-T" as used herein means a published Japanese translation of a PCT application)
Patent Literature 2: Japanese Patent No. 3164223

SUMMARY OF INVENTION

Technical Problem

A phosphate-based glass has low weather resistance and erosion easily occurs on the surface thereof by blurring or weathering when being used for a long term. Thus, the phosphate-based glass has poor practical utility (for example, see Patent Literature 2). When surface modification such as anti-glaring (AG) is performed on a cover glass, finish is significantly sensitive to a concentration change of an etching liquid. Thus, process margin significantly becomes small, and thus the yield is decreased or the cost is increased.

An object of the present invention is to provide a glass sheet which contains a phosphate and has a damage resistance and an acid resistance.

Solution to Problem

A glass sheet according to an aspect of the present invention is characterized by containing, as represented by mole percentage based on oxides, from 55.5 to 80% of $SiO_2$, from 12 to 20% of $Al_2O_3$, from 8 to 25% of $Na_2O$, 2.5% or more of $P_2O_5$, and 1% or more of an alkaline earth metal RO (RO is MgO+CaO+SrO+BaO).

It is preferable that a depth of the glass sheet at which a hydrogen amount is 1.05 times a bulk value thereof is equal to or more than 500 nm from a surface of the glass sheet. It is preferable that an average value of a hydrogen amount in a depth of from 500 nm to 1,000 nm from a surface of the glass sheet is equal to or more than 1.5 times a bulk value therof. It is preferable that the glass sheet contains, as represented by mole percentage based on oxides, from 57 to 76.5% of $SiO_2$, from 12 to 18% of $Al_2O_3$, from 8 to 25% of $Na_2O$, from 2.5 to 10% of $P_2O_5$, and 1% or more of the alkaline earth metal RO. It is preferable that the glass sheet further contains 0.1% or more of F.

The glass sheet which is capable of being chemically strengthened is more preferable.

Advantageous Effects of Invention

In the embodiment of the present invention, it is possible to provide a glass sheet which contains a phosphate and has a damage resistance and an acid resistance.

DESCRIPTION OF EMBODIMENTS

Hereinafter, an embodiment of the present invention will be described in detail. In this description, "mass reduction" and "weight reduction" have the same meaning. "To" indicating a numerical range is used to have the meaning of including numerical values described before and after "to" as a lower limit value and an upper limit value.

A glass sheet in the embodiment of the present invention is characterized by containing, as represented by mole percentage based on oxides, from 55.5 to 80% of $SiO_2$, from 12 to 20% of $Al_2O_3$, from 8 to 25% of $Na_2O$, 2.5% or more of $P_2O_5$, and 1% or more of an alkaline earth metal RO (RO is MgO+CaO+SrO+BaO).

It is preferable that in the embodiment of the present invention, the depth of the glass sheet at which the hydrogen amount is equal to or more than 1.05 times of a bulk value thereof is equal to or more than 500 nm from the surface thereof. The depth thereof is more preferably equal to or more than 700 nm and further preferably equal to or more than 1,000 nm. By introducing more hydrogen than the bulk value thereof into a region from the surface to a depth of at least 500 nm, it is possible to further improve the acid resistance in comparison to a bulk body. Thus, it is possible to largely increase process margin in an etching treatment and the like. Here, the bulk value indicates an average value of the hydrogen amount in a depth of 100 μm or more from the glass sheet. The bulk body indicates an untreated glass sheet which has been polished from the surface thereof to 100 μm or more.

In the glass sheet in the embodiment of the present invention, it is preferable that the average value of the hydrogen amount in a depth of from 500 nm to 1,000 nm from the surface thereof is equal to or more than 1.5 times the bulk value thereof. The average value thereof is more preferably equal to or more than 2 times, further preferably equal to or more than 2.5 times, and particularly preferably equal to or more than 3 times. With the average value of the hydrogen amount in a depth of from 500 nm to 1,000 nm from the surface thereof is equal to or more than 1.5 times the bulk value, it is possible to further improve the acid resistance in comparison to the bulk body. In order to prevent degradation of strengthening characteristics and a stress relaxation, an upper limit thereof is preferably equal to or less than 10 times.

The reason why the acid resistance is improved by thus introducing hydrogen into the surface is not understood in detail. However, the present inventors consider that the reason is as follows. That is, it is considered that a hydrogen ion introduced into the surface and an oxonium ion or a water molecule in an aqueous solution is repelled each other in electric charge and thus it is possible to improve the acid resistance.

As a method of increasing the hydrogen amount in the surface thereof, for example, the following is exemplified. That is, in a process of forming a glass to have a predetermined shape, a retention time at the vicinity of a formation temperature is lengthened or diffusion of water into the air is suppressed by increasing atmospheric pressure, and so on.

When a glass including a volatile component such as phosphoric acid or boric acid is produced, in order to eliminate a treatment of sediment by volatilization or composition irregularity, a method in which the glass is produced for a short period of time so as to have viscosity as high as possible in a range allowed to be handed, thereby suppressing volatilization.

On the other hand, when a hydrogen introduction treatment is performed into the surface of the glass in a production process according to the embodiment of the present invention, it is desirable that the hydrogen introduction treatment is performed at a temperature at which viscosity in a glass forming tank in which the surface of a glass substrate is formed is 10,000 poises to 500,000 poise.

In a case where the viscosity is more than 500,000 poises, it takes a long period of time to introduce hydrogen, and production efficiency is decreased. In a case where the viscosity is less than 10,000 poises, it takes a short period of time to introduce hydrogen. However, the bulk value is also increased by introducing the large hydrogen amount, and thus physical properties thereof are significantly changed. Excessive introduction of hydrogen into a bulk may degrade tempering characteristics, for example.

As another introduction method, a method in which thermal treatment is performed on a glass sheet at a temperature of Tg (glass transition point) or higher or a method in which acid treatment or alkali treatment is performed on the glass sheet is exemplified.

It is preferable that the glass sheet according to the embodiment of the present invention contains, as represented by mole percentage based on oxides, from 57 to 76.5% of $SiO_2$, from12 to 18% of $Al_2O_3$, from 8 to 25% of $Na_2O$, from 2.5 to 10% of $P_2O_5$, and 1% or more of the alkaline earth metal RO.

It is preferable that the glass sheet according to the embodiment of the present invention contains, as represented by mole percentage based on oxides, from 55.5 to 80% of $SiO_2$, from 12 to 20% of $Al_2O_3$, from 8 to 25% of $Na_2O$, 2.5% or more of $P_2O_5$, 0.1% or more of F, and 1% or more of the alkaline earth metal RO.

In the glass sheet according to the embodiment of the present invention, the reason of limiting a glass composition to the above range will be described below. In the description, a simple description of "%" means "mol %" as long as particular statements are not made.

$SiO_2$ is an essential component that constitutes a network of glass. $SiO_2$ is also an essential component that reduces an occurrence of cracking when a flaw (an indentation) is formed on the glass surface, or reduces a breakage rate when an indentation is imparted after chemical strengthening. With the content of $SiO_2$ which is equal to or more than 55.5%, it is possible to avoid degradation of stability, acid resistance, weather resistance, or chipping resistance as a glass. The content of $SiO_2$ is preferably equal to or more than 57% and more preferably equal to or more than 59%. With the content of $SiO_2$ which is equal to or less than 80%, it is possible to avoid degradation of the melting property due to an increase of the viscosity of the glass. The content of $SiO_2$ is preferably equal to or less than 76.5% and more preferably equal to or less than 72.5%.

$Al_2O_3$ is a component effective to improve ion exchange performance and chipping resistance or a component that increases the surface compressive stress, and is an essential component. With the content of $Al_2O_3$ which is equal to or more than 12%, a desired surface compressive stress value or compressive stress layer thickness is obtained by ion exchange. With the content of $Al_2O_3$ which is equal to or less than 20%, it is possible to prevent an increase of the viscosity of the glass and to perform uniform melting, or it is possible to avoid degradation of the acid resistance. The content of $Al_2O_3$ is preferably equal to or less than 18%, more preferably equal to or less than 16%, and further preferably equal to or less than 15%.

$P_2O_5$ is a component that improves the damage resistance without hindering the ion exchange performance, and is essential. With the content of $P_2O_5$ which is equal to or more than 2.5%, it is possible to obtain a glass which has high crack extension initiation load (CM). The content of $P_2O_5$ is preferably equal to or more than 3%, and more preferably equal to or more than 5%. It is possible to obtain a glass which is particularly excellent in the acid resistance, by setting the content of $P_2O_5$ to be equal to or less than 10%

$Na_2O$ is a component that forms a surface compressive stress layer by ion exchange and improves the melting property of the glass, and is essential. With the content of $Na_2O$ which is equal to or more than 8%, it is possible to form a desired surface compressive stress layer by ion exchange. The content of $Na_2O$ is preferably equal to or more than 10%, more preferably equal to or more than 12%, and further preferably equal to or more than 14%. With the content of $Na_2O$ which is equal to or less than 25%, it is possible to avoid degradation of the weather resistance or the acid resistance or to avoid the occurrence of cracking from the indentation. The content of $Na_2O$ is preferably equal to or less than 20% and more preferably equal to or less than 18%.

$K_2O$ is not essential but increases an ion exchange rate. $K_2O$ may be contained in a range of 5% or less. With the content of $K_2O$ which is equal to or less than 5%, it is possible to avoid the occurrence of cracking from the indentation or to avoid an increase of a change in the surface compressive stress due to the concentration of $NaNO_3$ in a potassium nitrate molten salt. The content of $K_2O$ is preferably equal to or less than 3% and more preferably equal to or less than 1%. In the case where it is desired to reduce the change of the surface compressive stress due to the concentration of $NaNO_3$ in the potassium nitrate molten salt, it is preferable that $K_2O$ is not contained.

The alkaline earth metal oxide (alkaline earth metal RO) of MgO, CaO, SrO, and BaO are components effective for improving the weather resistance and lowers the viscosity of the glass, thereby rendering the glass easy to be melted. The content of MgO+CaO+SrO+BaO is preferably equal to or more than 1% and more preferably equal to or more than 1.5%. From a point that it is possible to suppress an occurrence of devitrification and a decrease of an ion exchange rate, as an upper limit thereof, it is preferably equal to or less than 15%. As the upper limit thereof, it is more preferably equal to or less than 10% and further preferably equal to or less than 7%.

The preferable content of each component is as follows.

MgO is a component that increases the surface compressive stress and improves the melting property. Therefore, MgO may be contained in a range of 15% or less. With the content of MgO which is equal to or less than 15%, it is possible to avoid devitrification of the glass or the decrease of the ion exchange rate. The content of MgO is preferably equal to or less than 10%, more preferably equal to or less than 8%, and further preferably equal to or less than 5%.

CaO may be contained in a range of 5% or less in order to improve the melting property at a high temperature or to prevent the occurrence of devitrification. With the content of CaO which is equal to or less than 5%, it is possible to avoid reduction of the ion exchange rate or degradation of resistance against the occurrence of cracking. The content of CaO is preferably equal to or less than 3%, and more preferably equal to or less than 1%.

SrO may be contained if necessary, but SrO has a large effect of reducing the ion exchange rate in comparison to MgO or CaO. Therefore, it is preferable that the content thereof is equal to or less than 3% even when contained. Typically, SrO is not contained.

BaO has the largest effect of reducing the ion exchange rate among alkaline earth metal oxides. Therefore, it is preferable that BaO is not contained, or even when contained, the content thereof is equal to or less than 3%. Typically, BaO is not contained.

$ZrO_2$ is a component that improves hardness, suppresses stress relaxation by increasing a softening point, or improves the acid resistance. $ZrO_2$ may be contained in a range of 8% or less. With $ZrO_2$ which is equal to or less than 8%, it is possible to avoid the occurrence of cracking from an indentation or the increase of a devitrification temperature. The content of $ZrO_2$ is preferably equal to or less than 5%, more preferably equal to or less than 3%, and further preferably equal to or less than 2%.

F is a component that improves chemical durability. With the content of F which is equal to or more than 0.1%, it is possible to improve the acid resistance. $SnF_2$, $ZnF_2$, $AlF_3$, $MgF_2$, $SrF_2$, or $CaF_2$ can be used as a fluorine raw material. Since it is possible to prevent the occurrence of volatilization or devitrification and to stably produce the glass, an upper limit thereof is preferably equal to or less than 5%.

In addition, a chloride, a fluoride, or the like may be suitably contained as a refining agent for glass melting. Although the glass sheet in the present invention originally contains the above-described components, other components may be contained in a range without impairing the object of the present invention. In the case of containing such components, the total content of the components thereof is preferably equal to or less than 5% and more preferably equal to or less than 3%. The total content thereof is typically equal to or less than 1%.

In the glass sheet according to the embodiment of the present invention, when an indentation is formed by using a Vickers indenter, a pressing load of the Vickers indenter at which the incidence of cracking is 50% is preferably equal to or more than 300 gf, more preferably equal to or more than 400 gf, and further preferably equal to or more than 500 gf. If the pressing load of the Vickers indenter is less than 300 gf, a flaw easily occurs in the production process or transportation before the chemical strengthening treatment and therefore there is a probability that desired strength is not obtained even if the chemical strengthening treatment is performed.

The glass sheet according to the embodiment of the present invention generally has a sheet shape, but may be a flat sheet or a glass sheet subjected to bending. The glass according to the embodiment is a glass sheet which is formed to have a flat sheet shape by known glass forming methods such as a float method, a fusion method, and a slot down draw method.

The glass sheet according to the embodiment of the present invention has dimensions which is allowed to be formed by existing forming methods. That is, if a glass is formed by a float method, a continuous ribbon-like glass having a width by float forming is obtained. Finally, the glass is cut to have a size suitable for a use purpose.

That is, the glass sheet according to the present invention has a size of a display of a tablet PC, a smart phone, or the like or has a size of a window glass of a building or a house. The glass in the embodiment is generally cut to have a rectangular shape, but there is no problem when cut to have other shapes such as a circular shape or a polygonal shape. Example of the glass also include a glass subjected to hole making.

<Chemical Strengthening Treatment>

It is preferable that the glass sheet according to the present invention is a glass sheet which can be subjected to the chemical strengthening treatment, that is, a glass sheet for chemical strengthening. The chemical strengthening treatment can be performed by well-known methods in the related art. It is preferable that shape processing according to the use, for example, mechanical machining such as cutting, edge processing, and hole making is performed before the chemical strengthening treatment.

According to the chemical strengthening treatment, a glass substrate is brought into contact with a melt of an alkali metal salt (for example, a potassium nitrate salt) containing an alkali metal ion having a large ion radius (typically, K ion) by immersion or the like, thereby substituting a metal ion having a small ion radius (typically, Na ion) in the glass substrate with the metal ion having a large ion radius.

The chemical strengthening treatment can be performed, for example, by immersing the glass sheet in a molten salt of potassium nitrate at 300 to 550° C. for 5 minutes to 20 hours. Regarding ion exchange conditions, optimum conditions may be selected, considering the viscosity characteristics of glass, the use, the sheet thickness, the tensile stress in the inside of glass and the like.

Examples of the molten salt for performing the ion exchange treatment include, for example, an alkali nitrate such as potassium nitrate, potassium sulfate and potassium chloride, the alkali sulfate and an alkali chloride salt. The molten salt may be singly used or may be used in combination of plural kinds thereof. A salt including sodium may be mixed in order to adjust the chemical strengthening characteristics.

In the embodiment of the present invention, a treatment condition of the chemical strengthening treatment is not particularly limited and the best condition may be selected in consideration of characteristics of the glass, the molten salt, and the like.

The depth of a surface compressive stress layer of the chemically strengthened glass and the surface compressive stress value may be measured by using a surface stress meter (for example, FSM-6000 manufactured by Orihara Industrial Co., Ltd.) and the like.

The glass sheet in the embodiment of the present invention is subjected to the chemical strengthening treatment, and thus it is possible to obtain a chemically strengthened glass. Examples of a product using the chemically strengthened glass include a cover glass of, for example, a display device such as a digital camera, a mobile phone, and a mobile information terminal (PDA), and a glass substrate of a display.

The use of the glass sheet in the embodiment of the present invention is not particularly limited. In the case where the chemical strengthening is performed, the glass sheet has high mechanical strength, and therefore a glass sheet subjected to chemical strengthening is suitably used in a place where impact due to falling or contact with another material is anticipated.

Specifically, for example, there are uses for protection of machines or machinery, such as a cover glass for a display part of a mobile phone (including a multifunctional information terminal such as a smart phone), a PHS, a PDA, a tablet type terminal, a notebook type personal computer, a game machine, a portable music or video player, an E-book, an electronic terminal, a clock, a camera, a GPS, or the like, a cover glass of a monitor for operating a touch panel of the above devices, a cover glass of a cooking device such as a microwave or an oven toaster; a top sheet of an electromagnetic cooker or the like, or a cover glass of instruments such as a meter and a gauge, and a glass sheet for a reading unit of a copier, a scanner, or the like.

In addition, for example, there are uses such as a window glass of a vehicle, a ship, an aircraft, and the like, a cover glass of a household or industrial lighting device or a cover glass of a signal, a guide lamp, and an electric bulletin board, and a showcase and a bulletproof glass. There are uses of cover glasses for protection of solar cells and condensing glass materials for increasing the power generation efficiency of solar cells.

For example, there are uses such as a glass for various mirrors, further, a base of an information storage medium such as a HDD, and a substrate of an information storage medium such as a CD, a DVD, and a Blu-lay disk.

For example, there are uses such as a water tank, a tableware such as a dish or a cup, various cooking tools such as a bottle or a chopping board, a cupboard, a shelf and a wall of a refrigerator, and a building material such as a roof or a partition.

In addition to such uses, the chemically strengthened glass produced by performing the chemical strengthening treatment on the glass sheet in the embodiment of the present invention is also suitably used as a glass material for a display embedded in various image display devices of liquid crystal, plasma, organic EL, and the like.

EXAMPLES

Examples of the present invention will be specifically described below. However, the present invention is not limited thereto.

[Producing Glass Sheet]

Glass raw materials having been commonly used such as an oxide, a hydroxide, a carbonate or a nitrate were appropriately selected so as to obtain the composition which is shown in columns from $SiO_2$ to F in Examples 1 to 7 and Comparative Examples 1 and 2 in Table 1 and Table 2, and is represented by a mole percentage, and weighed to be 900 g as a glass. Then, the mixed raw material was put into a platinum crucible, introduced into a resistance heating type electric furnace at 1,650° C. and melted for 4 hours, followed by refining and homogenization.

The molten glass obtained was cast into a mold material and held at a temperature of Tg+30° C. for 1 hour. Then, it was cooled to room temperature at a rate of 0.5° C/min to obtain glass blocks. This block was cut and polished, and finally, both surfaces thereof were finished to mirror surfaces to obtain a sheet glass having a size of 20 mm×20 mm and a sheet thickness of 1 mm Regarding Examples 6 and 7, heat treatment was performed on the obtained glass at a predetermined temperature and for a predetermined time in Table 2, and thus the hydrogen introduction treatment into the outermost surface was performed.

50%CIL (gf), an acid resistance (unit: $mg/cm^2$), and an acid resistance improvement rate (%) of the glass and "bulk value, 500 to 1,000 nm depth average value, surface/bulk coefficient" of the hydrogen amount are shown in Tables 1 and 2.

[Measurement of Physical Properties]

(1) 50%CIL

A CIL (crack initiation load) value was determined through the following method. In a Vickers hardness tester, a Vickers indenter was pressed for 15 seconds at a room temperature in the atmosphere, and then the Vickers indenter was removed. After 15 seconds, the vicinity of an indentation was observed. In the observation, how many cracks occur at the corner of the indentation was examined. The measurement was performed for pressing loads of the Vickers indenter of 100 gf, 200 gf, 300 gf, 500 gf, 1 kgf, and 2 kgf. An average value of the number of the occurring cracks was calculated for each of the loads, and the pressing load of the Vickers indenter, at which the incidence of cracking was 50% was set to be 50%CIL.

(2) Acid Resistance Test

The acid resistance was calculated in a manner that the obtained sheet glass was immersed in 0.1mol/l of hydrochloric acid warmed to 50° C. for 3 hours, the amount of the reduced mass before and after the immersion was measured, and the measured value was divided by the surface area of the sheet glass.

(3) Improvement Rate(%)

The improvement rate of the acid resistance before and after the heat treatment was determined as follows. "100− (mass reduction after the heat treatment)/(mass reduction before the heat treatment)*100"(%)

(4) Measurement of a Hydrogen Concentration Profile

A hydrogen concentration profile of the glass is a profile measured under the following analysis condition. Secondary ion mass spectrometry (SIMS) was used for the measurement of hydrogen concentration profile of a glass substrate. A glass substrate to be measured is simultaneously fed into a SIMS device and measuring is sequentially performed to obtain a depth direction profile of the intensities of $^1H^-$ and $^{30}Si^-$. Then, the $^{-1}H^-$ profile is divided by the $^{30}Si$ profile to obtain a depth direction profile of a $^1H^-/^{30}Si^-$ intensity ratio. From the depth direction profile of the $^1H^-/^{30}Si^-$ intensity ratio, an average $^1H^-/^{30}Si^-$ intensity ratio in a region of depth from 500 nm to 1,000 nm is calculated. Here, there is a probability that an influence of surface alteration or contamination due to being left is reflected to the outermost surface. Therefore, the hydrogen amount at a depth of 500 nm or more from the surface is compared. A SIMS measurement condition is as follows.

[Measurement Condition of SIMS]

Device: ADEPT1010 manufactured by ULVAC-PHI, Inc.
Primary ion species: $Cs^+$
Primary ion acceleration voltage: 5 kV
Primary ion current value: 200 nA
Primary ion incident angle: 60° relative to a normal line of a sample plane
Primary ion raster size: 300×300 $\mu m^2$ Secondary ion polarity: negative Secondary ion detection region: 60×60 μm² (4% of the raster size of the primary ion)

Use of neutralizing gun: yes

Method of converting a horizontal axis from a sputtering time to a depth: The depth of an analysis crater is measured with a stylus type surface profile analyzer (Dektak150 manufactured by Veeco Inc.) and a primary ion sputtering rate is determined. Using the sputtering rate, the horizontal axis is converted from the sputtering time to the depth.

Field Axis Potential in $^1H^-$ detection: The optimum value may change in every device. An operator should carefully define the value so that the back ground is fully cut off The bulk value described in Table 2 is an average value of hydrogen concentration in a depth of from 500 nm to 1,000 nm from the surface in an untreated glass sheet which has been polished to a depth of 200 μm from the surface thereof. Similarly, the 500 to 1000 nm depth average value is an average value of hydrogen concentration in a depth of from 500 nm to 1,000 nm from the surface in a glass sheet which has been subjected to the each treatment. The surface/bulk coefficient is a value which shows how many times the hydrogen amount in the 500 to 1000 nm depth average value is compared to the bulk value thereof. The hydrogen introduction depth is a depth at which the hydrogen amount is 1.05 times the bulk value thereof.

TABLE 1

| (mol %) | Ex. 1 | Ex. 2 | Ex. 3 | Ex. 4 | Ex. 5 | Comparative Ex. 1 | Comparative Ex. 2 |
|---|---|---|---|---|---|---|---|
| $SiO_2$ | 60.0 | 61.0 | 63.0 | 68.0 | 59.7 | 68.0 | 55.0 |
| $Al_2O_3$ | 13.0 | 15.0 | 12.0 | 12.0 | 18.5 | 10.0 | 17.0 |
| $P_2O_5$ | 6.0 | 4.0 | 7.0 | 3.0 | 2.8 | | 5.0 |
| $Na_2O$ | 17.0 | 16.0 | 14.0 | 16.0 | 17.0 | 14.0 | 18.0 |
| MgO | 4.0 | 3.0 | 1.0 | 1.0 | 1.5 | 8.0 | 5.0 |
| CaO | | | 3.0 | | 0.5 | | |
| F | | 1.0 | | | | | |
| Total | 100 | 100 | 100 | 100 | 100 | 100 | 100 |
| RO | 4.0 | 3.0 | 4.0 | 1.0 | | 8.0 | |
| 50% not-strengthened CIL (gf) | 781 | 553 | 1,130 | 1,048 | | 250 | |
| Acid resistance (mass reduction (mg/cm²)) | 0.034 | 0.018 | 0.106 | 0.072 | 1.394 | | 1.684 |

TABLE 2

| (mol %) | Ex. 5 | Ex. 6 | Ex. 7 | Comparative Ex. 2 |
|---|---|---|---|---|
| $SiO_2$ | 59.7 | 55.0 | 59.7 | 55.0 |
| $Al_2O_3$ | 18.5 | 17.0 | 18.5 | 17.0 |
| $P_2O_5$ | 2.8 | 5.0 | 2.8 | 5.0 |
| $Na_2O$ | 17.0 | 18.0 | 17.0 | 18.0 |
| MgO | 1.5 | 5.0 | 1.5 | 5.0 |
| CaO | 0.5 | | 0.5 | |
| F | | | | |
| Total | 100 | 100 | 100 | 100 |
| Heat treatment temperature (° C.) | — | 800 | 800 | — |
| Heat treatment time (h) | — | 48 | 48 | — |
| Bulk value | 0.0205 | — | — | 0.0242 |
| 500 to 1,000 nm depth average value | 0.0205 | 0.0802 | 0.0731 | 0.0242 |

TABLE 2-continued

| (mol %) | Ex. 5 | Ex. 6 | Ex. 7 | Comparative Ex. 2 |
|---|---|---|---|---|
| Surface/bulk coefficient | 1.00 | 3.31 | 3.57 | 1.00 |
| Acid resistance (mass reduction (mg/cm²)) | 1.39 | 1.52 | 1.12 | 1.68 |
| Improvement rate (%) | — | 10 | 20 | — |

The following considerations were obtained from results shown in Table 1 and Table 2.

In Examples 1 to 4, an aluminosilicate glass contains 2.5% or more of $P_2O_5$ as represented by mole percentage based on oxides, and thus 50%CIL is equal to or more than 500 gf.

On the other hand, in Comparative Example 1, $P_2O_5$ is not contained. In this case, 50%CIL shows a low value of 250 gf.

That is, it is understood that when an aluminosilicate glass contained 2.5% or more of $P_2O_5$ as represented by mole percentage based on oxides, a glass having high damage resistance and having 50%CIL of 500 gf or more was obtained.

In Examples 1 to 5, from 55.5% to 80% of $SiO_2$ and from 12% to 20% of $Al_2O_3$ are contained in an aluminosilicate glass as represented by a mole percentage based on oxide, and thus mass reduction is equal to or less than 1.5 mg/cm². Further among these, it was understood that by setting each of contents of $SiO_2$ to be from 57% to 76.5% and $Al_2O_3$ to be from 12% to 18% as in Examples 1 to 4, mass reduction was equal to or less than 0.15 mg/cm². Further, as in Example 2, 0.1% or more of F is contained in an aluminosilicate glass as represented by mole percentage based on oxides, and thus mass reduction is equal to or less than 0.03 mg/cm², and further it is possible to suppress the occurrence of mass reduction.

In Comparative Example 2, $SiO_2$ is equal to or less than 55.5%. Thus, mass reduction is equal to or more than 1.6 mg/cm².

That is, it was understood that from 57% to 76.5% of $SiO_2$ and from 12% to 18% of $Al_2O_3$ were contained in an aluminosilicate glass where the percentages are represented by a mole percentage based on oxide, and thus a glass having high acid resistance in which mass reduction was equal to or less than 0.15 mg/cm² was obtained. It was understood that 0.1% or more of F was contained, and thus the acid resistance was further improved.

In Examples 6 and 7, the average value of the hydrogen amount in a region of a depth of from 500 nm to 1,000 nm from the surface is three times or more the bulk value therof. In the glasses, the acid resistance is improved by 10% or more. In particular, in Example 7 where the change of the hydrogen amount is larger, an effect of improving the acid resistance is high. The hydrogen introduction depth in Examples 6 and 7 was equal to or more than 1,000 nm.

The present invention is described in detail with reference to the specific embodiment. However, various changes and modifications may be made without departing from the gist and the scope of the present invention, and this is obvious for those skilled in the art. This application is based upon and claims the benefit of priority from Japanese Patent Application No. 2014-261984 filed on Dec. 25, 2014. The contents of those applications are incorporated herein by reference in their entireties.

INDUSTRIAL APPLICABILITY

The glass sheet in the embodiment of the present invention can be used for a substrate of a thin solar cell, a cover glass of a display device, a window glass, or the like. The glass sheet can be suitably used for a cover glass of a mobile device or the like by performing chemical strengthening.

The invention claimed is:

1. A glass sheet comprising, as represented by mole percentage based on oxides, from 59 to 76.5% of $SiO_2$, from 12 to 20% of $Al_2O_3$, from 8 to 25% of $Na_2O$, and comprising $P_2O_5$, wherein a content of $P_2O_5$ is 2.5 to 3%, a content of MgO is 1.5% or less, SrO is not contained, BaO is not contained, and when an indentation is formed by using a Vickers indenter, a pressing load of the Vickers indenter at which an incidence of cracking is 50% is equal to or more than 300 gf.

2. The glass sheet according to claim 1, comprising, as represented by mole percentage based on oxides, from 61 to 72.5% of $SiO_2$, from 12 to 18% of $Al_2O_3$, from 8 to 18% of $Na_2O$, from 2.5 to 3% of $P_2O_5$, and 1% or more of the alkaline earth metal RO (RO is MgO+CaO+SrO+BaO).

3. The glass sheet according to claim 1, further comprising 0.1% or more of F.

4. The glass sheet according to claim 1, wherein a depth at which a hydrogen amount is 1.05 times a bulk value thereof is equal to or more than 500 nm from a surface of the glass sheet.

5. The glass sheet according to claim 1, wherein an average value of a hydrogen amount in a depth of from 500 nm to 1,000 nm from a surface of the glass sheet is equal to or more than 1.5 times a bulk value thereof.

6. The glass sheet according to claim 4, wherein an average value of a hydrogen amount in a depth of from 500 nm to 1,000 nm from a surface of the glass sheet is equal to or more than 1.5 times a bulk value thereof.

7. The glass sheet according to claim 1, which is capable of being chemically strengthened.

* * * * *